United States Patent [19]

Van et al.

[11] Patent Number: 5,438,561
[45] Date of Patent: Aug. 1, 1995

[54] METHOD FOR RECORDING AND REPRODUCING INFORMATION USING AN OPTICAL MEMORY

[75] Inventors: Kazuo Van, Nara; Kenji Ohta, Kitakatsuragi; Toshio Ishikawa, Nara, all of Japan

[73] Assignee: Sharp Kabushiki Kaisha, Osaka, Japan

[21] Appl. No.: 329,690

[22] Filed: Oct. 26, 1994

Related U.S. Application Data

[63] Continuation of Ser. No. 741,806, Aug. 6, 1991, abandoned.

[30] Foreign Application Priority Data

Aug. 10, 1990 [JP] Japan ................................. 2-212620

[51] Int. Cl.⁶ .............................................. G11B 7/00
[52] U.S. Cl. .................................. 369/100; 369/108; 369/44.38; 365/118
[58] Field of Search .................. 369/108, 100, 275.2, 369/284, 286, 288, 94, 93; 365/119, 106, 113, 109, 119, 106; 430/945

[56] References Cited

U.S. PATENT DOCUMENTS

| | | | |
|---|---|---|---|
| 4,403,318 | 9/1983 | Nagashima et al. | 369/100 |
| 4,864,536 | 9/1989 | Lindmayer | 369/119 |
| 5,088,086 | 2/1992 | Van et al. | 365/106 |
| 5,113,387 | 5/1992 | Goldsmith et al. | 369/121 |
| 5,142,493 | 8/1992 | Lindmayer | 369/119 |

FOREIGN PATENT DOCUMENTS

| | | |
|---|---|---|
| 0353391 | 2/1990 | European Pat. Off. . |
| 0373939 | 6/1990 | European Pat. Off. . |
| 0165747 | 7/1987 | Japan . |
| 0165748 | 7/1987 | Japan . |
| 0165751 | 7/1987 | Japan . |

*Primary Examiner*—Aristotelis Psitos
*Assistant Examiner*—Thang V. Tran
*Attorney, Agent, or Firm*—David G. Conlin; Peter F. Corless

[57] ABSTRACT

A method for recording and reproducing information using an optical memory device being constituted by a transparent substrate, a recording film formed on the substrate and made of a resin containing a photochromic material dispersed therein, the photochromic material being capable of reversibly changing its state from achromatic to chromatic and absorbing light of at least 780 nm wavelength in the chromatic state, and a reflecting film formed on the recording film for reflecting light, the method including the steps of: applying a visible light beam of a long wavelength onto the optical memory device to turn said recording film into the achromatic state for initialization, applying thereafter a visible light beam of a short wavelength onto the optical memory device to turn the recording film into the chromatic state in accordance with binary-coded data of information for recording the information, and applying another visible light beam of a long wavelength having a light intensity lower than that of the visible light beam for initialization onto the optical memory device for reproducing the information having been recorded therein.

9 Claims, 3 Drawing Sheets

METHOD FOR RECORDING AND REPRODUCING INFORMATION USING AN OPTICAL MEMORY

This is a continuatin of application Ser. No. 07/741,806 filed, on Aug. 6, 1991, now abandoned.

BACKGROUND OF THE INVENTION

1. Field of the Invention

This invention relates to a method for recording and reproducing information using optical memory devices incorporating photochromic materials, and particularly to a method for recording and reproducing information by which information stored in the optical devices can be reproduced using commercially available CD (Compact Disk) player systems.

2. Description of the Related Art

There have been developed a magnetooptical disk, a phase-change type disk and the like as optical memory devices for recording, erasing and reproducing information by utilizing light. In the magnetooptical disk, information is recorded in a manner such that a laser beam is applied onto a magnetic recording film to raise the temperature thereof up to about the Curie point for reducing antimagnetic properties thereof, and then an external magnetic field, which can be inverted in accordance with ON-OFF signals of information, is applied thereonto so that the information is recorded. On the other side, in the phase-change type disk, information is recorded in a manner such that a laser beam, which is ON-OFF controlled in accordance with ON-OFF signals of information, is applied onto a phase-change type recording film to fuse crystals of the laser-applied portion thereof or to rapidly cool the fused crystals for changing the phase thereof from crystalline state to amorphous state or vice versa, thereby recording the information.

By the way, CD-player systems for home use are now prevailing in developed countries, and accordingly it would be convenient if the information recorded in the aforesaid rewritable type optical memory devices can be reproduced with such CD-player systems.

With the aforesaid magnetooptical disk and phase-change type disk, however, information is recorded by transforming laser light into thermal energy, and therefore the laser light is substantially absorbed by the recording film, resulting in theoretically weakened reflected light. For this reason the CD-player systems of which standard requires optical memory devices to have the reflectance of 70% or more with respect to the light of 780 nm wavelength have a difficulty in reproducing the information recorded in the above optical disks.

For increasing the reflectance, Japanese Unexamined Patent Publication No. 12428/1982 have disclosed a magnetooptical disk which is so arranged that a thin magnetooptical film is formed over a light-reflecting member such as a Au film having a sufficient reflectance with respect to the light for reproducing information in order to enlarge the Kerr rotation angle. Despite such an arrangement, the reflectance remains as low as about 30%, and thus the S/N ratio is insufficient for reproducing information.

On the other hand, heretofore known is a method for recording and reproducing information in which a recording film is made of a binder resin containing a photochromic material dispersed therein, and light is applied onto the recording film to turn it into a chromatic state thereby recording and reproducing information. Also, various photochromic materials to be used in such a method have been proposed (Japanese Unexamined Patent Publication No. 122577/1984; "Photomemory Materials: Present State and Future Prospect in Japan", Proc. Int. Symp. on Optical Memory, 1987, Japanese Journal of Applied Physics, Vol. 26(1987) Supplement 26-4).

However, no one knows that the above method has realized an access to commercially available CD-player systems.

SUMMARY OF THE INVENTION

Thus, the present invention provides a method for recording and reproducing information using an optical memory device being constituted by a transparent substrate, a recording film formed on said substrate and made of a resin containing a photochromic material dispersed therein, said photochromic material being capable of reversibly changing its state from achromatic to chromatic and absorbing light of at least 780 nm wavelength in the chromatic state, and a reflecting film formed on said recording film for reflecting light, said method comprising the steps of:

applying a visible light beam of a long wavelength onto said optical memory device to turn said recording film into the achromatic state for initialization, applying thereafter a visible light beam of a short wavelength onto said optical memory device to turn said recording film into the chromatic state in accordance with binary-coded data of information for recording said information, and applying another visible light beam of a long wavelength having a light intensity lower than that of said visible light beam for initialization onto said optical memory device for reproducing said information having been recorded therein.

In the method of the present invention, when the visible light beam of a long wavelength having a relatively low light intensity is applied for reproducing the information, the areas of the recording film remained initialized are in the achromatic state and thus the intensity of the reflected light is high, while the recorded areas of the recording film are in the chromatic state and thus the intensity of the reflected light is low because of light absorption. Further, the recording film absorbs light of 780 nm wavelength, so that the information recorded in the optical memory device can be reproduced by means of even a commercially available CD-player system.

DETAILED DESCRIPTION OF THE PREFERRED EMBODIMENTS

In the present invention the visible light beam of a long wavelength is first applied onto the optical memory device to initialize the recording film. In this case the wavelength of the light beam used for the initialization is suitably 600–800 nm, while the intensity of a light source is suitably 5–20 mW. Applying such a light beam causes the recording film to turn into a uniform achromatic state, thereby accomplishing the initialization of the recording film.

After the initialization, binary-coded information is recorded by applying the visible light beam of a short wavelength onto the device. In this case the wavelength of the visible light beam of a short wavelength is suitably 400–500 nm, while the intensity of a light source is suitably about 5–20 mW. The information recording is performed by applying a condensed light beam from the light source which is ON-OFF controlled in accordance with binary-coded data of the information.

In the case of reproducing the recorded information, applied onto the optical memory device is the visible light beam of a long wavelength which is, however, lower than the aforesaid visible light for initialization in light intensity. The intensity of the light beam for reproduction is usually set as low as 1/5–1/100 of that of the light beam for initialization. The wavelength of the light beam for reproduction is suitably 600–800 nm, while the intensity of the light source is suitably about 0.1–1 mW. Particularly, the light beam for reproduction is preferably 780 nm in wavelength or has a wavelength band including 780 nm to meet the object of the invention.

For the photochromic material and binder resin used in the recording film with which the method of the invention can be realized, the compounds and resins recited below may be used. It is suitable to set the content of the photochromic material in the recording film to 10–50 wt. %, the thickness of the recording film to 0.1–3 μm, and the thickness of the reflecting film to 20–100 nm.

EXAMPLE

An example of the present invention will hereinafter be described with reference to FIGS. 1 through 4, and which is, however, merely an example and accordingly is not limitative of the invention.

Figure 1:
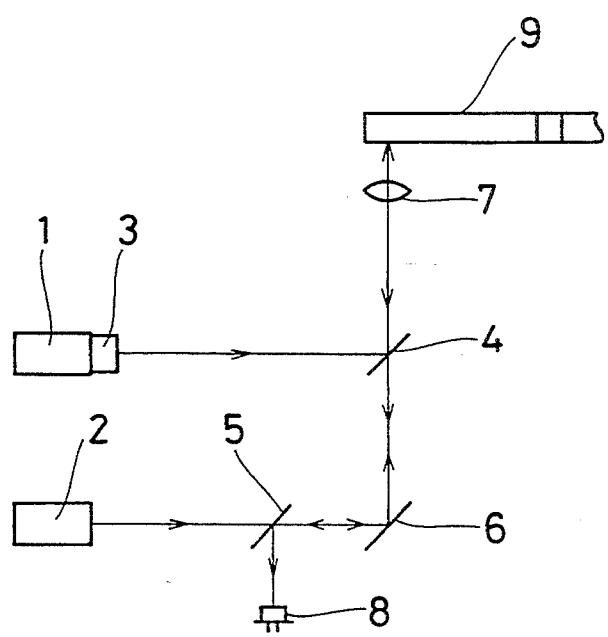
FIG. 1 is a schematic illustration of an apparatus for recording and reproducing information to which a method for recording and reproducing information of the invention is applied.

As shown in FIG. 1, an apparatus for recording and reproducing information to which the method of the invention is applied includes mainly a laser diode 1 for recording information, a laser diode 2 for reproducing and erasing information, an SHG (second harmonic generator) 3 for generating the second harmony of a light beam generated by the laser diode 1, half-mirrors 4 and 5, a reflector 6, an objective lens 7, a light detector 8 and an optical disk 9 as an optical memory device.

In this example the wavelength of the light beam generated by the laser diode 1 is 830 nm, and then the light beam is converted into a visible light beam of a short wavelength of 415 nm for recording information. On the other hand, a light beam, which is generated by the laser diode 2 for reproducing and erasing information, is a visible light beam of a long wavelength of 680 nm.

Figure 2:
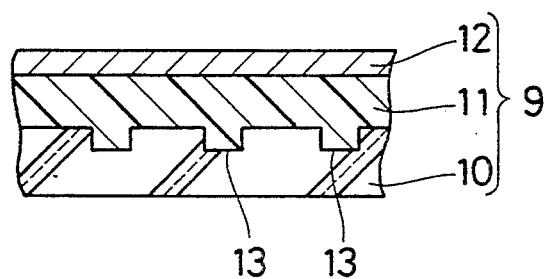
FIG. 2 is a sectional view schematically illustrating an optical disk in which a photochromic material is used.

As shown in FIG. 2, the optical disk 9 is constituted by a transparent glass substrate 10, a recording film 11 of 2 μm thick formed on the substrate 10, and a reflecting film 12 formed on the recording film 11. The recording film 11 is made of a PMMA resin containing 20 wt .% of a photochromic material dispersed therein. The substrate 10 has guide grooves 13 in the surface of the film-forming side.

Figure 3:
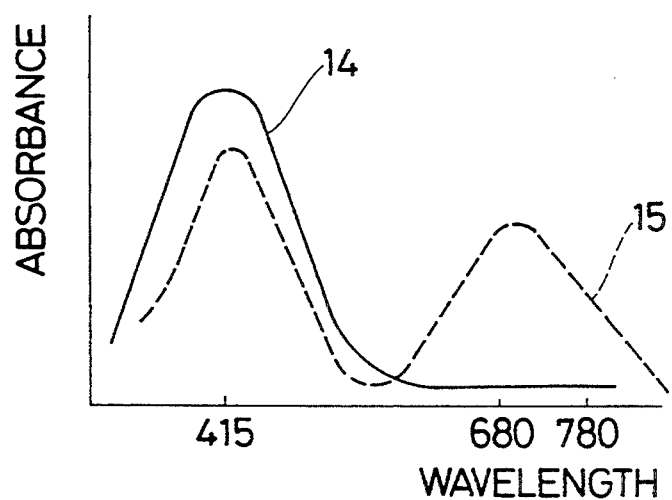
FIG. 3 is an absorption spectrum of the photochromic material in the achromatic and chromatic states.

In this example, the photochromic material used in the recording film 11 substantially absorbs in its achromatic state the light beam for recording information, for example, a light beam of 415 nm wavelength, while in contrast hardly absorbing the light beam for reproducing information, for example, the light beam of 680 nm wavelength used in this example and a light beam of 780 nm wavelength used in a commercially available CD-player system, both being visible light beams of long wavelengths. When the photochromic material is in the chromatic state, however, it absorbs the light beams of 680 nm and 780 nm wavelengths. FIG. 3 shows the absorption spectrum of such photochromic material, and which includes a curve 14 representing the absorption spectrum of the material in the achromatic state and a curve 15 representing the absorption spectrum thereof in the chromatic state.

Specific examples of the photochromic material are diarylethene derivatives and nitrospirothiopyran. A diarlylethene derivative of the following chemical structure:

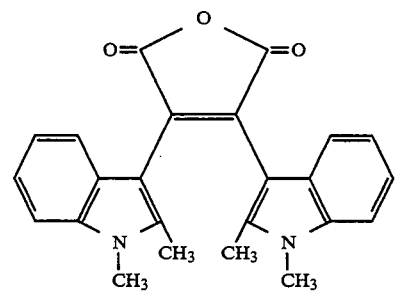

has its absorption peak at 620 nm wavelength in the visible light range when in the chromatic state, and the absorption edge of this absorption band extends to 800 nm wavelength [see Japanese Chemistry Spring Meeting transaction, ZXIIE07, p.1837 (1988)]. On the other side, nitrospirothiopyran has its absorption peak at 700 nm wavelength in the visible light range when in the chromatic state, and the absorption edge of its absorption band extends to 900 nm wavelength, as disclosed in Japanese Unexamined Patent Publication No. 122577/1984.

The photochromic material is dissolved or dispersed in an appropriate solvent together with a polymeric binder such as PMMA, polystyrene and polyvinyl chloride, and the resulting mixture is spin-coated onto the guide groove-formed side of a substrate 10 made of glass, polycarbonate and the like thereby forming the recording film 12 (FIG. 2). On the recording film 11 deposited is a high reflectance metal such as A1, Au and the like to form the reflecting film 12.

In the above arrangement a visible light beam is applied onto the entire surface of the optical disk 9 from the substrate side, so that the disk 9 turns into the achromatic state (curve 14 in FIG. 3) to be initialized. Thus, the disk is now ready for use.

When information is to be recorded, a laser beam of 830 wavelength (light source: 10 mW) generated from the laser diode 1 (FIG. 1) is converted into a light beam of 415 nm wavelength by SHG, reflected by the half-mirror 4, condensed by the objective lens 7, and applied onto the optical disk 9 being rotated. The light beam transmitting through the substrate 10 is absorbed by the photochromic material existing in the light applied portion of the recording film 11, so that the photochromic material is turned from the achromatic state into the chromatic state (curve 15 in FIG. 3). The laser beam generated from the laser diode 1 is ON-OFF controlled in accordance with ON-OFF data of the information to be recorded, whereby the desired information is recorded.

On the other hand, when the recorded information is to be reproduced, a light beam of 680 nm wavelength having a relatively low intensity, which is generated by the laser diode 2, is transmitted through the half-mirror 5, reflected by the reflector 6, and transmitted through the half-mirror 4. The light beam is then condensed by the objective lens 7 and applied onto the optical disk 9. The light beam transmitted through the substrate 10 of the disk 9 is applied onto the recording film 11, then reflected by the reflecting film 12. The reflected light beam is condensed by the objective lens 7, transmitted through the half-mirror 4, reflected by the reflector 6, further reflected by the half-mirror 5, and applied to the light detector 8 to detect the light intensity thereof.

Figure 4:
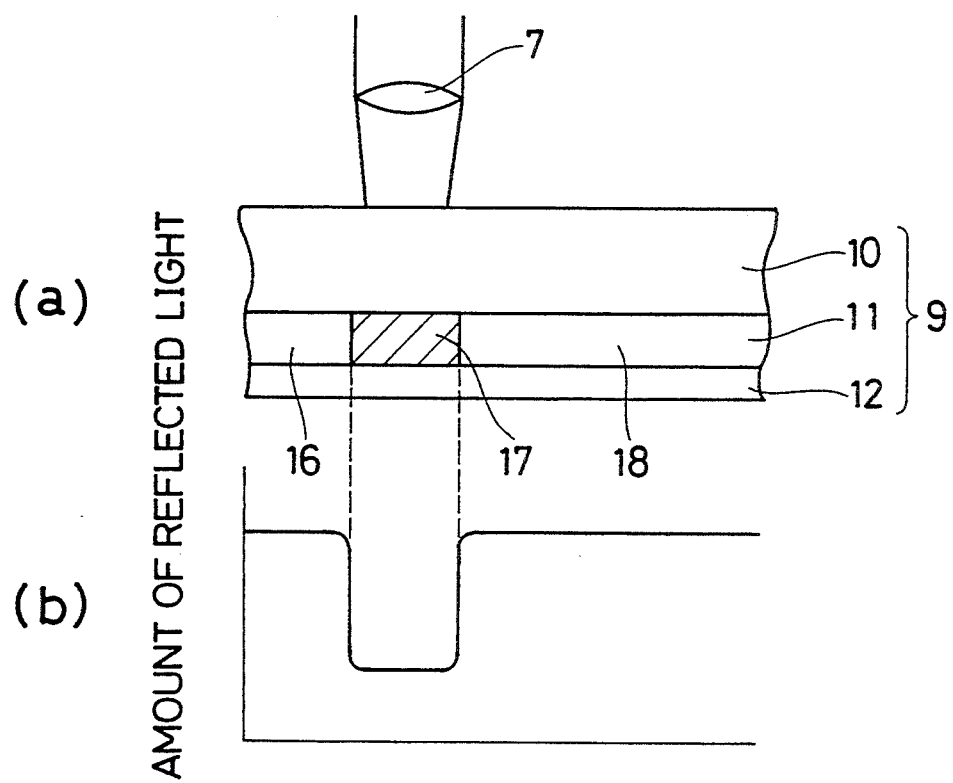
FIG. 4 is an explanatory view schematically illustrating the amount of reflected light for reproducing information.

As shown in FIG. 4, the intensity of the light beam reflected from the optical disk 9 varies depending on whether the photochromic material is in the achromatic state or in the chromatic state. In detail, as shown in FIG. 5(a), a region 17 of the recording film 11 is in the chromatic state, while regions 16 and 18 adjacent the region 17 are in the achromatic state. The achromatic regions 16 and 18 absorb little the light beam of 680 nm wavelength (see FIG. 3), and accordingly a large amount of light reflected therefrom is detected, as shown in FIG. 4(b). On the other hand, the chromatic region 17 absorbs a large amount of the light beam of 680 nm wavelength, so that the amount of light reflected therefrom is small. In such a manner the information is reproduced on the basis of the amount of the reflected light.

Erasing the information is performed using the laser diode 2 as in reproducing the information, but a light beam having a higher intensity than that for reproduction is applied onto the recording film 11 to turn the photochromic material from the chromatic state into the achromatic state.

Tracking control during recording, reproducing and erasing the information is performed by detecting the light reflected from the guide groove 2 by means of the light detector 8. For the tracking control, so-called 3-beam technique or push-pull technique which is widely used in CD-player systems can be used.

The information recorded in the above optical disk 9 can be reproduced using commercially available CD-player systems, because such systems use a light beam of 780 nm wavelength. As mentioned above, the optical disk 9 used in the present example incorporates the photochromic material which exhibits little absorption at 680 nm wavelength and 780 nm wavelength in the chromatic state, but which, in the chromatic state, exhibits significant absorption at not only 680 nm wavelength but also 780 nm wavelength. Accordingly, the information recorded in the optical disk 9 can also be reproduced with the commercially available CD-player systems using a visible light beam of 780 nm wavelength by detecting the variation in the amount of reflected light in the above manner, as shown in FIG. 4(b). In addition, since the regions 16 and 18 in the achromatic state exhibit little absorption at 780 nm, the reflectance of more than 70% can be assured with the help of the reflecting film 10.

Although the information can be efficiently erased by applying the light beam of absorption peak wavelength within the visible light band to the photochromic material in the chromatic state, it can also be erased with less efficiency by application of the light beam of any wavelength within the visible light absorption band, for example, a light beam of 780 nm. It should be understood that the output of a light beam used in the commercially available CD-player systems is sufficiently low (about 0.2–0.3 mW), so that the information is never erased by this light beam.

Accordingly, in the information reproducing apparatus shown in FIG. 1, the wavelength of the light beam generated from the laser diode 2 may be set to 780 nm, and the output of the light beam may be changed over for reproducing or erasing information. This arrangement of the apparatus allows the recording, reproducing and erasing of information in an accurate fashion using the optical disk 9 containing the photochromic material, and the reproduction of the information recorded in CDs as well.

What is claimed is:

1. A method of recording and reproducing information using an optical memory device comprising a transparent substrate, a recording film formed on said substrate and made of a resin containing a photochromic material dispersed therein, said photochromic material being capable of reversibly changing its state from achromatic to chromatic and absorbing light of at least 780 nm wavelength in the chromatic state, and a reflecting film formed on said recording film for reflecting light, said method comprising the steps of:

applying a visible light beam of a long wavelength onto said optical memory device to turn said recording film into the achromatic state for initialization, applying thereafter a visible light beam of a short wavelength onto said optical memory device to turn said recording film into the chromatic state in accordance with binary-coded data of information for recording said information, and applying another visible light beam of a long wavelength having a light intensity lower than that of said visible light beam for initialization onto said optical memory device for reproducing said information having been recorded therein, the information being reproduced by using a difference in the light intensity between the light reflected by a chromatic region in which information is recorded and the light reflected by an achromatic region in which information is not recorded, the light intensity reflected by the chromatic region being smaller than the light intensity reflected by the achromatic region.

2. The method of claim 1, wherein the visible light beam of a short wavelength used for recording the information has mainly a wavelength of 400 to 500 nm.

3. The method of claim 1, wherein the visible light beam of a long wavelength used for reproducing the information has mainly a wavelength of 600 to 800 nm.

4. The method of claim 1, wherein the visible light beam of a long wavelength used for reproducing the information has a light intensity as low as 1/5 to 1/100 of that of the visible light beam of a long wavelength used for initialization.

5. The method of claim 1, wherein the reflecting film is formed from Al or Au by vapor deposition.

6. The method of claim 1, wherein the photochromic material is a diallylethene derivative or nitrospirothiopyran.

7. The method of claim 1, wherein the information recorded in the optical memory device is reproducible using a commercially available CD-player system.

8. The method of claim 1 wherein the photochromic material has an absorption peak at a wavelength of about 780 nm.

9. The method of claim 1 wherein the photochromic material has an absorption peak at a predetermined wavelength within the visible light spectrum.

* * * * *